United States Patent
Nishiguchi et al.

(10) Patent No.: US 7,453,390 B2
(45) Date of Patent: Nov. 18, 2008

(54) DETECTION DEVICE AND DETECTION METHOD

(75) Inventors: Tadao Nishiguchi, Tanabe (JP);
Naoyuki Ishihara, Kyoto (JP);
Yasuhiro Satoh, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/726,854

(22) Filed: Mar. 23, 2007

(65) Prior Publication Data
US 2007/0222593 A1   Sep. 27, 2007

(30) Foreign Application Priority Data
Mar. 23, 2006   (JP)   ............. 2006-081258

(51) Int. Cl.
*G01S 13/18*   (2006.01)
*G01S 13/10*   (2006.01)
*G01S 7/292*   (2006.01)
*G01S 7/32*   (2006.01)
*G01S 13/00*   (2006.01)

(52) U.S. Cl. ................ 342/28; 342/27; 342/89; 342/94; 342/118; 342/134; 342/175; 342/195

(58) Field of Classification Search .......... 342/21, 342/27, 28, 59, 89–103, 118, 134–145, 175, 342/195; 340/500, 540, 541, 552, 565, 567
See application file for complete search history.

(56) References Cited

U.S. PATENT DOCUMENTS

| | | | | |
|---|---|---|---|---|
| 3,161,870 A | * | 12/1964 | Pincoffs | 342/59 |
| 3,300,768 A | * | 1/1967 | Bystrom et al. | 340/552 |
| 3,487,462 A | * | 12/1969 | Holberg | 342/59 |
| 3,794,992 A | * | 2/1974 | Gehman | 342/28 |
| 3,858,205 A | * | 12/1974 | Ross | 342/21 |
| 3,986,182 A | * | 10/1976 | Hackett | 342/28 |
| 4,017,854 A | * | 4/1977 | Ross | 342/21 |

(Continued)

FOREIGN PATENT DOCUMENTS

DE   101 51 740 A1   4/2003

(Continued)

OTHER PUBLICATIONS

European Search Report issued in Application No. 07104692.4-2220 dated Jul. 3, 2007, 9 pages.

(Continued)

*Primary Examiner*—Bernarr E Gregory
(74) *Attorney, Agent, or Firm*—Osha • Liang LLP

(57) ABSTRACT

A detection device for detecting a body entering a predetermined range has a transmission means for periodically radiating a pulse-like transmission signal by way of an electromagnetic wave to which a band restriction has been applied, a first reception means and a second reception means, and a judgment means. Each of the reception means performs receiving, as a reception signal, the electromagnetic wave reflected by the body, periodic sampling of the reception signal after a predetermined delay time has elapsed from transmission, and judging, based on a result of the periodic sampling, whether the body exists. The judgment means judges, based on judgment results of each of the first reception means and the second reception means, whether the body has entered into the predetermined range, and outputs a judgment result.

4 Claims, 11 Drawing Sheets

U.S. PATENT DOCUMENTS

| | | | |
|---|---|---|---|
| 4,086,586 A * | 4/1978 | Spirig | 342/27 |
| 4,091,367 A * | 5/1978 | Harman | 340/552 |
| 4,673,183 A * | 6/1987 | Trahan | 342/28 |
| 5,798,730 A | 8/1998 | Sanchez | |
| 6,031,482 A * | 2/2000 | Lemaitre et al. | 342/27 |
| 6,215,438 B1 * | 4/2001 | Oswald et al. | 342/27 |
| 6,400,307 B2 * | 6/2002 | Fullerton et al. | 342/28 |
| 6,573,857 B2 * | 6/2003 | Fullerton et al. | 342/28 |
| 6,614,384 B2 * | 9/2003 | Hall et al. | 342/28 |
| 6,710,736 B2 * | 3/2004 | Fullerton et al. | 342/28 |
| 6,822,604 B2 * | 11/2004 | Hall et al. | 342/28 |

FOREIGN PATENT DOCUMENTS

| | | |
|---|---|---|
| EP | 1 530 061 A | 5/2005 |
| JP | 2001-264419 | 9/2001 |
| JP | 2005-140542 | 6/2005 |

OTHER PUBLICATIONS

Patent Abstracts of Japan, Publication No. 2001-264419 dated Sep. 26, 2001, 1 page.

* cited by examiner

DETECTION DEVICE AND DETECTION METHOD

BACKGROUND OF THE INVENTION

1. Field of the Invention

The present invention is related to a detection device and a detection method, and relates specifically to a detection device and a detection method for reducing a detection leak when detecting a body that has entered into a predetermined range.

2. Description of the Related Art

A sensor or detection device detecting an existence of a body or a distance to the body by radiating an electromagnetic wave and receiving the electromagnetic wave reflected by the body ("reflection signal") is widely used in industrial apparatuses such as ships, aircrafts, meteorological observation devices, and plants. One example of a conventional detection device uses a pulse radar (e.g., refer to JP-A-2001-264419).

Additionally, a detection device in which a resistance against a disturbance wave has been improved in comparison with the conventional detection device is disclosed in JP-A-2005-140542, assigned to the assignees of the present invention.

In conventional detection devices, detection leaks can occur when detecting a body that has entered into the predetermined range.

SUMMARY OF THE INVENTION

In one or more embodiments of the present invention, a detection device for detecting a body entering a predetermined range comprises a transmission means for periodically radiating a pulse-like transmission signal by way of an electromagnetic wave to which a band restriction has been applied, a first reception means and a second reception means, and a judgment means. Each of the reception means performs receiving, as a reception signal, the electromagnetic wave reflected by the body, periodic sampling of the reception signal after a predetermined delay time has elapsed from transmission, and judging, based on a result of the periodic sampling, whether the body exists. The judgment means judges, based on judgment results of each of the first reception means and the second reception means, whether the body has entered into the predetermined range, and outputs a judgment result. The delay time of the second reception means is deviated from the delay time of the first reception means by a half-period of a wave of a main frequency of the transmission signal.

One or more embodiments of the present invention has an advantage of reducing a detection leak when detecting a body that has entered into a predetermined range.

In one or more embodiments of the present invention, a transmission means may comprise, for example, a local oscillator oscillating a clock signal of a frequency of MHz order, an impulse formation circuit forming, based on the clock signal, a steep pulse (impulse)-like signal, and an antenna radiating the signal by way of an electromagnetic wave.

In one or more embodiments of the present invention, each of the first reception means and the second reception means comprises, for example, an antenna for receiving a reception signal, and a circuit, for example a computer, that performs analysis of the reception signal. If the circuit is a computer, software for conducting analysis of the reception signal is implemented by the computer.

In one or more embodiments of the present invention, the judgment means comprises a circuit performing signal analysis, for example, a computer with software to implement the signal analysis.

In one or more embodiments of the present invention, a delay time of a second reception means is set to be longer than a delay time of a first reception means, by a half-period of a wave of a main frequency of the transmission signal.

In one or more embodiments of the present invention, an approaching body can be detected further away, and thus the object can be detected sooner.

In one or more embodiments of the present invention the predetermined range is a distance from the detection device of less than one meter, and the shape of the body is variable.

In one or more embodiments of the present invention, a detection method in a detection device that periodically radiates a pulse-like transmission signal by way of an electromagnetic wave to which a band restriction has been applied, receives, as a reception signal, the electromagnetic wave reflected by a body, and detects, based on the reception signal, the body that has entered into a predetermined range comprise the steps of individually performing, in two systems, periodic sampling of the reception signal after a predetermined delay time has elapsed from transmission of the transmission signal and then judging, based on a result of the periodic sampling, whether the body exists, and judging, based on judgment results of each of the two systems, whether the body has entered into the predetermined range, and outputting a judgment result. The delay time of one of the two systems is deviated from the delay time of another of the two systems, by a half-period of a wave of a main frequency of the transmission signal.

DESCRIPTION OF THE PREFERRED EMBODIMENTS

In order to facilitate an understanding of the present invention, an example of a detection device previously invented by the inventors of the present invention is explained at the outset, with reference to FIG. 1 to FIG. 5.

Figure 1:
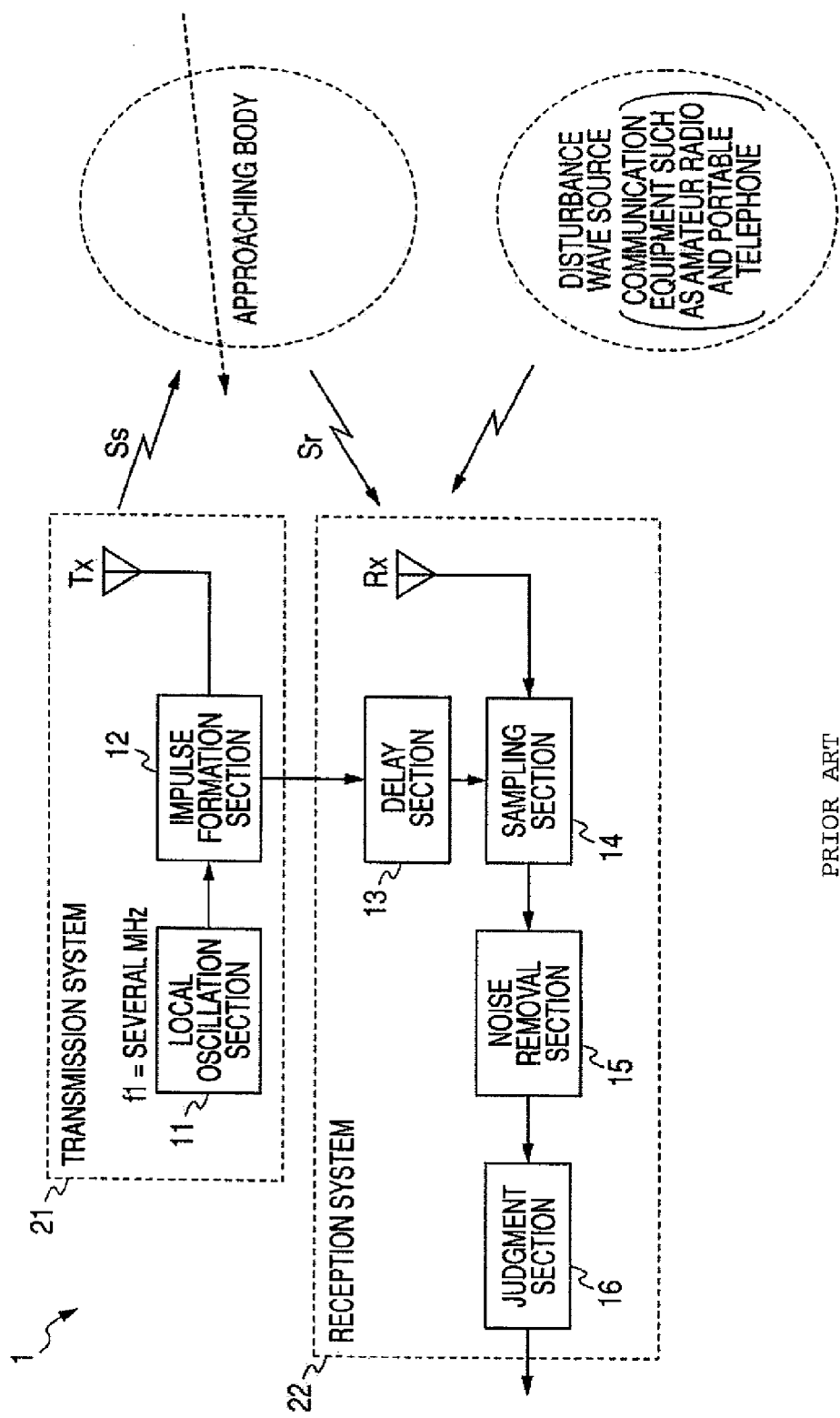
FIG. 1 is a block diagram showing a constitution example of a conventional pulse sensor.

FIG. 1 shows a constitution example of the detection device having been already invented by the present inventors and having been disclosed in the above-mentioned JP-A-2005-140542. Incidentally, hereafter, a detection device 1 of a constitution in FIG. 1 is refereed to as a pulse sensor 1 while being merged with a description of JP-A-2005-140542. Additionally, in order to distinguish the pulse sensor 1 from a later-mentioned detection device to which one or more embodiments of the present invention has been applied, it is referred to as a conventional pulse sensor 1.

The conventional pulse sensor 1 of the example in FIG. 1 is constituted so as to include a transmission system 21 and a reception system 22 in order to make it possible to detect a change in an approach body (an approaching body in the same drawing) in a specified distance from itself.

The transmission system 21 is constituted so as to include a local oscillation section 11, an impulse formation section 12, and an antenna Tx.

The local oscillation section 11 forms a clock signal of a frequency f1 of several MHz, for instance, and provides it to the impulse formation section 12.

The impulse formation section 12 periodically forms a steep pulse (impulse)-like signal on the basis of the clock signal from the local oscillation section 11, and provides it to the antenna Tx and a delay section 13.

The antenna Tx periodically radiates an output signal of the impulse formation section 12 in a form of the electromagnetic wave as a transmission signal Ss.

In contrast to the transmission system 21 like this, the reception system 22 is constituted so as to include an antenna Rx, the delay section 13, a sampling section 14, a noise removal section 15, and a judgment section 16.

The antenna Rx receives, within the transmission signal Ss having been periodically radiated from the antenna Tx, the electromagnetic wave having been reflected at the object (in the example of FIG. 1, the approaching body) as a reception signal Sr, and provides this to the sampling section 14 in a form of an electric signal.

Every time an output signal of the impulse formation section 12 is periodically provided, the delay section 13 provides a predetermined signal (hereafter, refereed to as a delay signal) to the sampling section 14 at a timing having been delayed by a predetermined delay time from an offer timing of the output signal. As to a setting technique for this delay time, there may be adopted any technique known to the public. For example, it is possible to adopt such a technique that the delay section 13 is constituted so as to include an LC section or an RC section, and the delay time is set by a time constant of the LC section or the RC section.

Every time a delay signal is periodically provided from the delay section 14, the sampling section 14 samples the reception signal Sr from the antenna Rx. That is, a timing at which the delay signal is provided from the delay section 13 is approximately equivalent to a timing at which the predetermined delay time has elapsed after the transmission signal Ss corresponding to that delay signal has been radiated from the antenna Tx. Accordingly, it can be said that, every time the predetermined delay time elapses from each transmission timing of the periodic transmission signal Ss, the sampling section 14 samples each reception signal Sr from the antenna Tx. That is, the sampling section 14 samples each reception signal Sr at a timing having been synchronized with each transmission signal Ss.

Incidentally, as to this timing of the sampling, it is possible to adopt, e.g., by previously determining when the body is detected in a case where it has been placed in how distance from the pulse sensor 1 (Hereafter, the distance having been determined like this is referred to as a detection distance.), a reception timing of the reception signal Sr about the object concerned which is placed while being separated by this detection distance. That is, a necessary time from the radiation of the transmission signal Ss to the reception of the reception signal Sr at this time is previously found, and a time corresponding to the necessary time concerned is set as the delay time of the delay section 13. And, if the delay signal is outputted from the delay section 13 in which such a delay time has been set, the sampling section 14 performs a sampling of the reception signal Sr at an output timing of the delay signal.

The noise removal section 15 is constituted, e.g., by a low pass filter, a high pass filter and the like, removes a noise such as harmonic from a signal (hereafter, referred to as a sampling signal) having been outputted from the sampling section 14, and provides a signal obtained as a result to the judgment section 16.

The judgment section 16 compares a level value of the signal from the noise removal section 15, i.e., a level value of the sampling signal from which the noise has been removed, with a predetermined threshold value and, on the basis of its comparison result, judges whether or not the object exists, thereby outputting its judgment result. For example, here, the judgment section 16 judges whether or not the level value concerned is above the threshold value and, if it is above the threshold value, it judges that a reflection signal has been obtained because the body has existed, and outputs a predetermined signal (It is a signal to the effect that there has been detected the fact that the body exists and, hereafter, referred to as a detection signal.). Concretely for example, if it is above the threshold value, the judgment section 16 outputs a signal (voltage change) which has been proportional to an electric power intensity of the reflection signal and, if it is less than the threshold value, it does not output the voltage change.

Figure 2:
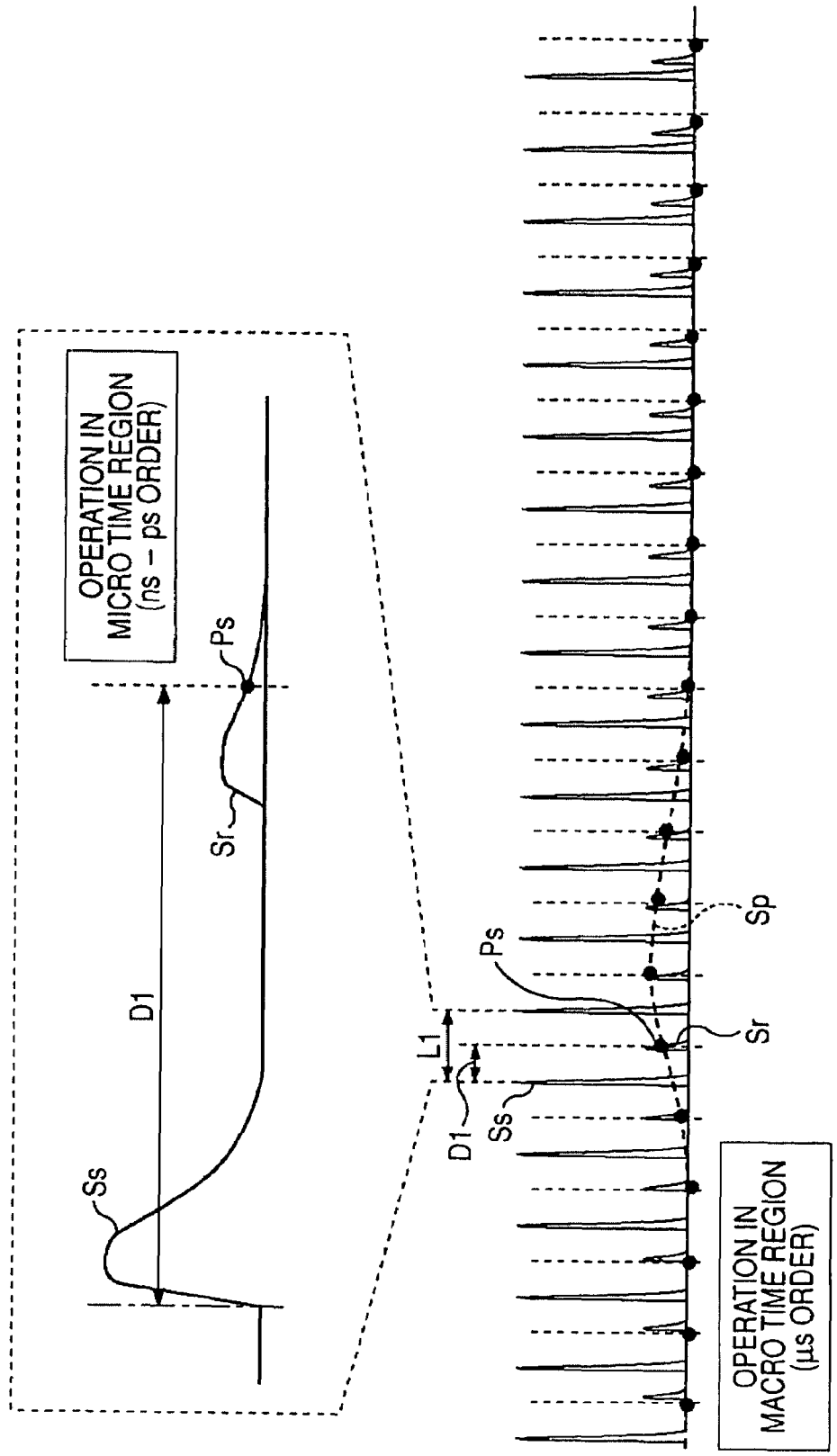
FIG. 2 is a timing chart explaining an operation of a sampling in a case where the conventional pulse sensor in FIG. 1 has transmitted a transmission signal of an ideal impulse waveform.

FIG. 2 is a timing chart explaining an operation of the sampling when the conventional pulse sensor 1 detects the body approaching it.

In FIG. 2, a downside timing chart shows the timing chart explaining the operation of a time region of µs order. Further, an upside timing chart shows an enlarged view of one part within the downside timing chart, i.e., a timing chart explaining the operation of a time region of ns to ps order. Further, in each timing chart, an axis of ordinate shows amplitude intensity and an axis of abscissa a time, respectively. Incidentally, as to the axis of ordinate, it is deemed that the amplitude intensity is stronger as going upward in the drawing, i.e., a level of the signal is higher. Further, as to the axis of abscissa, it is deemed that the time flows in a direction going from left to right. Incidentally, it is deemed that this assumption is similar also about FIG. 4 mentioned later.

As shown in FIG. 2, the transmission system 21 (FIG. 1) of the conventional pulse sensor 1 periodically radiates the transmission signal Ss, which is a pulse-like irradiation wave, at a constant period L1. And, the reception system 22 (FIG. 1) of the conventional pulse sensor 1 attempts the sampling of the reception signal Sr after a delay time D1 having been previously set. A sampling value at this time is shown as a point Ps in FIG. 2.

More accurately, as having been mentioned above, the operation of this sampling is performed by the sampling section 14 within the reception system 22. This sampling section 14 additionally forms an electric signal Sp of a waveform (waveform shown by a dotted line in FIG. 2), in which each sampling value Ps has been linked, as the sampling signal, and provides it to the judgment section 16 through the noise removal section 15.

In this case, as the body approaches the conventional pulse sensor 1, i.e., as a distance between the conventional pulse sensor 1 and the body becomes short, a time (hereafter, referred to as a transmission-reception time) from the transmission signal Ss has been radiated to the reception signal Sr is received is shortened. In FIG. 2, this fact is expressed as a state in which an impulse waveform of the reception signal Sr gradually approaches an impulse waveform of the transmission signal Ss.

Further, as having been mentioned above, the delay time D1 is set so as to become a time corresponding to the detection distance.

Accordingly, when the approaching body has approximately reached to the detection distance, the transmission-reception time coincides with the delay time D1 and, as a result, it follows that a level value of a protrusion point (highest point) of the impulse waveform of the reception signal Sr is obtained as the sampling value Ps. Further, during that body exists near the detection distance, as apparent from the upside timing chart (the timing chart explaining the operation in a micro time region) in FIG. 2, from the fact that the transmission-reception time and the delay time D1 somewhat deviate, it follows that a level value in a midway point of the impulse waveform of the reception signal Sr is obtained as the sampling value Ps.

As a result, the waveform of the sampling signal Sp becomes as shown by the dotted line in FIG. 2. That is, if the body approaches till a vicinity of the detection distance, a level change occurs, and such a waveform that, thereafter as the body approaches, the level gradually increases and, thereafter as the body additionally approaches, the level gradually decreases with a time point at which the body has approximately reached to the detection distance being made a boundary (with that place being made a highest point), becomes the waveform of the sampling signal Sp.

Figure 3:
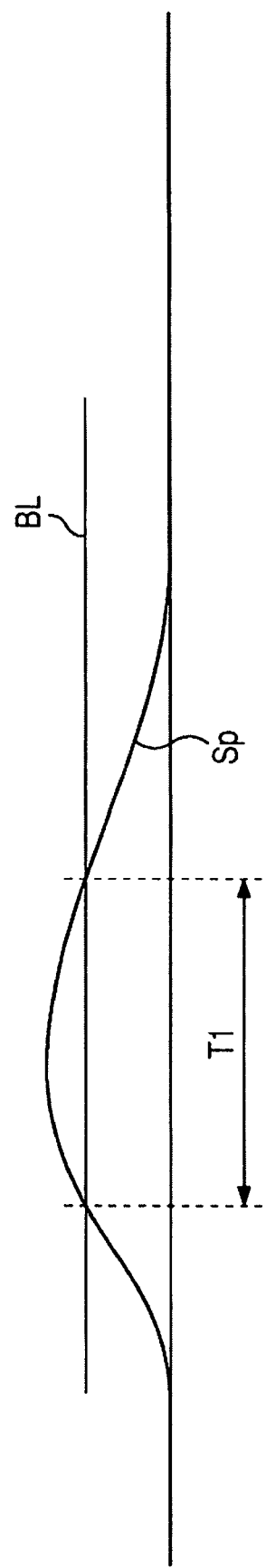
FIG. 3 is a timing chart explaining a detection operation in a case where the conventional pulse sensor in FIG. 1 has transmitted an ideal pulse as the transmission signal.

The sampling signal Sp like this, which is shown by the dotted line in FIG. 2, is provided to the judgment section 16 after having been outputted from the sampling section 14 in FIG. 1 and after the noise has been removed in the noise removal section 15. Whereupon, the as shown in FIG. 3, the judgment section 16 compares a level value of the sampling signal Sp with a threshold value BL and, if that level value is above the threshold value BL, outputs the detection signal. That is, in an example in FIG. 3, it follows that, in a term T1, the detection signal is outputted from the judgment section 16.

Incidentally, in the timing chart of the example in FIG. 3, an axis of ordinate shows a level intensity of the signal and an axis of abscissa the time, respectively. Further, as to the axis of ordinate it is deemed that the level of the signal is higher as; going upward in the drawing. Further, as to the axis of abscissa, it is deemed that the time flows in the direction going from left to right. It is deemed that this assumption is similar also about FIG. 5 mentioned later.

Figure 4:
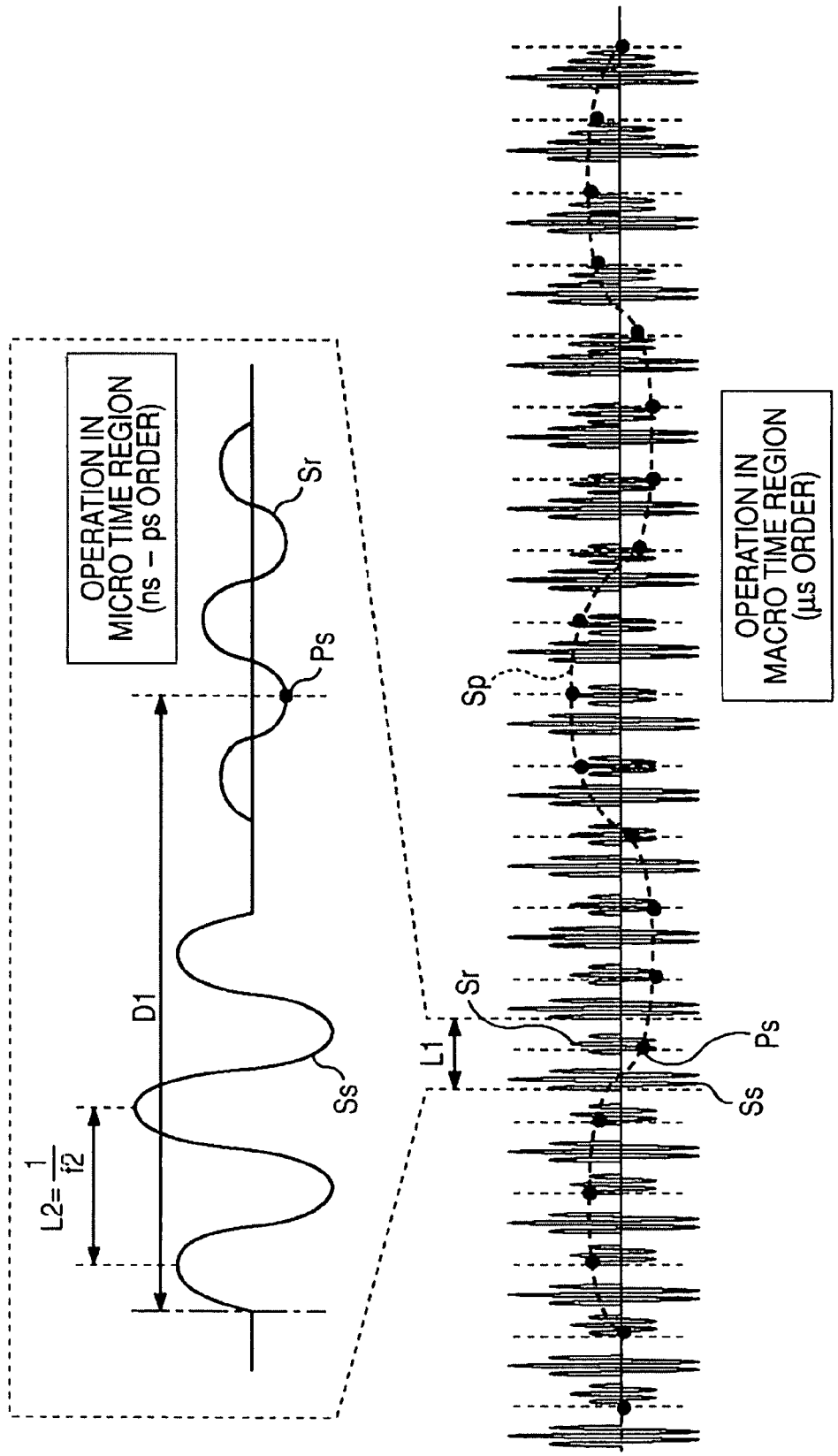
FIG. 4 is a timing chart explaining the operation of the sampling in a case where the conventional pulse sensor in FIG. 1 has transmitted a transmission signal to which a band restriction has been applied.

The content having been explained above by using FIG. 2 and FIG. 3 is a content in a case where the waveform of the transmission signal Ss becomes an ideal impulse shape. However, actually, as to the transmission signal Ss, a band restriction is made by a constitution of the antenna, a regulation in Radio Wave Law of Japan, and the like, and there is a tendency that an electric power intensity of a specified frequency becomes strong. As a result, the actual transmission signal Ss does not become the ideal impulse shape and, as shown in FIG. 4, becomes a waveform in which, with a waveform of a period L2 of ns to ps order, i.e., a waveform of a frequency f2 ($=1/L2$) of GHz order, being made a main waveform, each waveform (not shown in FIG. 4) of other frequency with respect to that main wave form has been synthesized. Thereupon, hereafter, the frequency f2 of the main waveform is referred to as a main frequency f2. Although there is mentioned later about details, in one or more embodiments of the present invention, there is used the transmission signal Ss including the main waveform of the main frequency f2.

Further, also by a frequency characteristic that a constitutional component such as a circuit component for transmitting, the antenna, and the like has, there is a case where there occurs the band restriction in the waveform of the transmission signal Ss. Also in the case like this, since it follows that the transmission signal Ss includes the waveform of such a main frequency f2 as shown in FIG. 4, it is possible to apply one or more embodiments of the present invention.

That is, FIG. 4 is a timing chart explaining the operation of the sampling when detecting the body approaching itself in a case transmitting the transmission signal Ss to which the band restriction has been made.

Although the operation itself of the sampling in the case where the transmission signal Ss to which the band restriction has been applied is omitted because it becomes similar to the operation having been explained by using FIG. 2, if there is made the operation of the sampling in the case where the transmission signal Ss to which the band restriction has been applied has been has been radiated, it follows that, as a result, from the sampling section 14 in FIG. 1 there is outputted the sampling signal Sp shown by the dotted line in FIG. 4, i.e., the sampling signal Sp having the waveform of a predetermined period (in the example in FIG. 4, a period of about 10*L1). And, it follows that such a sampling signal Sp is provided to the judgment section 16 after the noise has been removed in the noise removal section 15.

Figure 5:
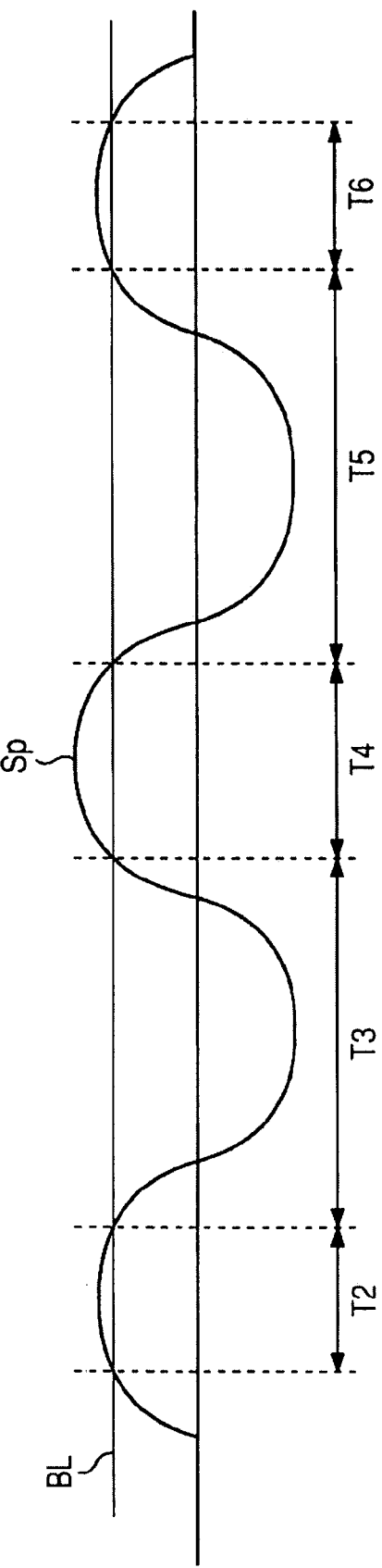
FIG. 5 is a timing chart explaining the detection operation in the case where the conventional pulse sensor in FIG. 1 has transmitted the transmission signal to which the band restriction has been applied.

Whereupon, as shown in FIG. 5, the judgment section 16 compares the level value of the sampling signal Sp with the threshold value BL, judges on the basis of its result whether or not the body exists and, if that level value is above the threshold value BL, outputs the detection signal. That is, in the example in FIG. 5, it follows that the detection signal is outputted from the judgment section 16 in terms T2, T4, T6.

Here, there is considered a case where, in a use detecting the body approaching into a predetermined range, there is used the conventional pulse sensor 1.

In this case, although it follows that a distance to a predetermined one point in the predetermined range is set as the detection distance, there is demanded the fact that the body existing in that predetermined range is detected without a leak as far as possible, not there is demanded the fact that only the body existing just in the detection distance is accurately detected, i.e., not there is demanded the fact that the body existing in a position having deviated even a little from the detection distance is not detected. That is, it is demanded to increase as far as possible a distance range capable of detecting.

Especially, in a case where that predetermined range is below one meter, especially a distance range of several centimeters to several tens centimeters, the electric power intensity that the body concerned reflects greatly fluctuates. Further, in a case where a shape of the body is variable, the electric power intensity that the body reflects greatly fluctuates. For example, in a use detecting a human body and the like, which attempt to contact with the conventional pulse sensor 1, there are combined the above-mentioned two cases, i.e., there are combined two elements of the fact that it is a very short distance and the fact that the shape of the body is variable, so that a reception electric power intensity of the conventional pulse sensor 1 greatly fluctuates. That is, in a case where a refection electric power intensity having followed upon the approach of the body is set as the detection distance capable of being originally detected and, even if the body has just existed in that detection distance, its reception electric power intensity has fluctuated and has become an extremely low state, there generates a problem that the body concerned is not detected. Accordingly, in order to suppress as far as possible the generation of the problem like this, it is especially demanded to increase the distance range capable of detecting.

However, in the conventional pulse sensor 1, the distance range capable of detecting is limited. For example, in the above-mentioned example in FIG. 5, it follows that, during the body exists in the distance ranges corresponding to the terms T2, T4, T6, that body is detected, but during the body exists in the distance ranges corresponding to terms T3, T5, that body is not detected. That is, in the example in FIG. 5, the distance ranges corresponding to the terms T2, T4, T6 become ranges in which a sensitivity detecting the approach of the body is good (There can be said also ranges in which a lowest reception sensitivity is low. Hereafter, such a region is refereed to as a sensitivity good range.). In contrast to this, the distance ranges corresponding to the terms T3, T5 become ranges in which the sensitivity detecting the approach of the body is bad (There can be said also ranges in which the lowest reception sensitivity is high. Hereafter, such a region is refereed to as a sensitivity bad range.).

Like this, in the conventional pulse sensor 1, it follows that the sensitivity good range and the sensitivity bad range occur alternately. As a result, if the conventional pulse sensor 1 is utilized in the use detecting the body approaching into the predetermined range, there generates an issue that, if the body enters into the sensitivity bad range, the detection leak occurs, i.e., the issue having been mentioned above.

Figure 6:
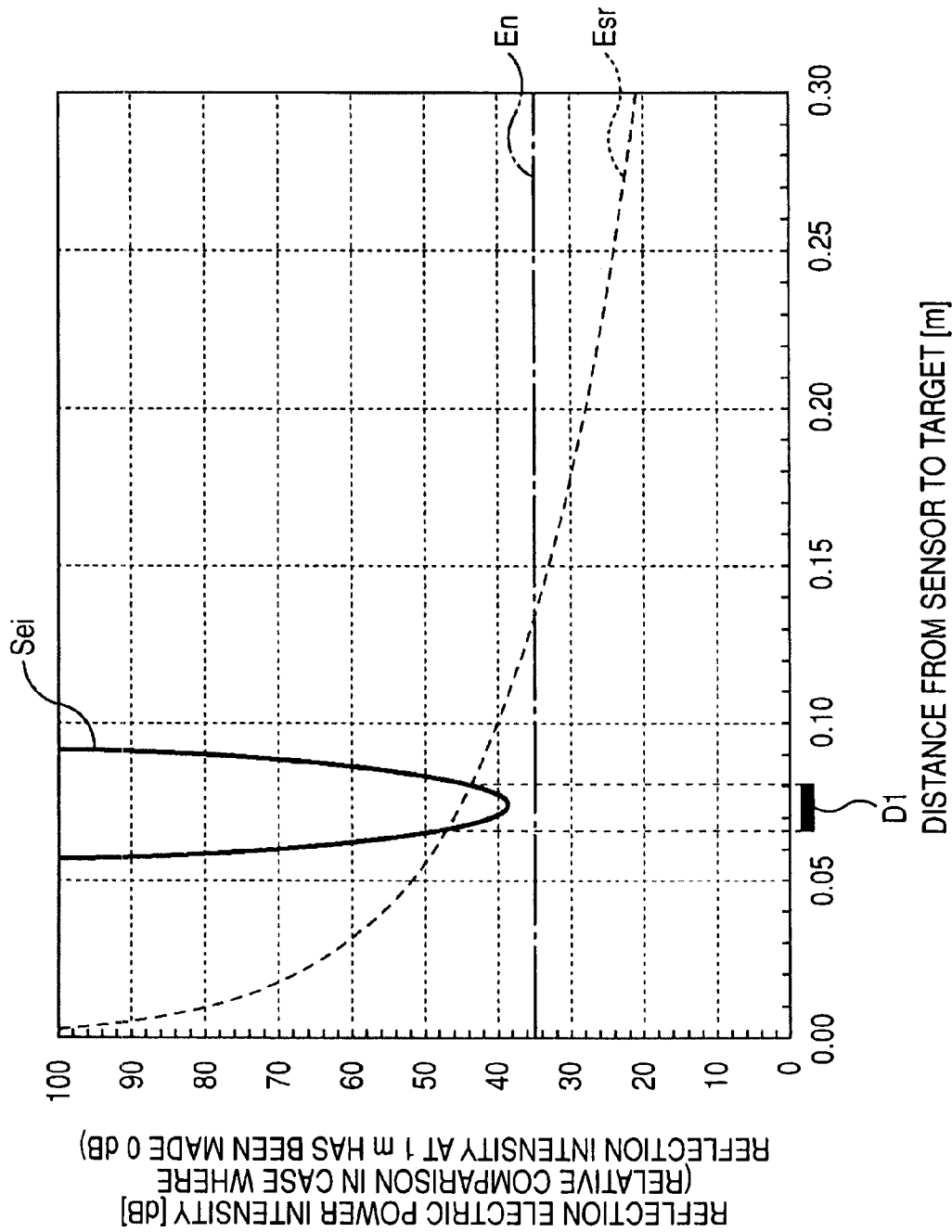
FIG. 6 is a view explaining one example of a detection possible range of the conventional pulse sensor in FIG. 1 in a case where the transmission signal of the ideal impulse waveform is outputted.
Figure 7:
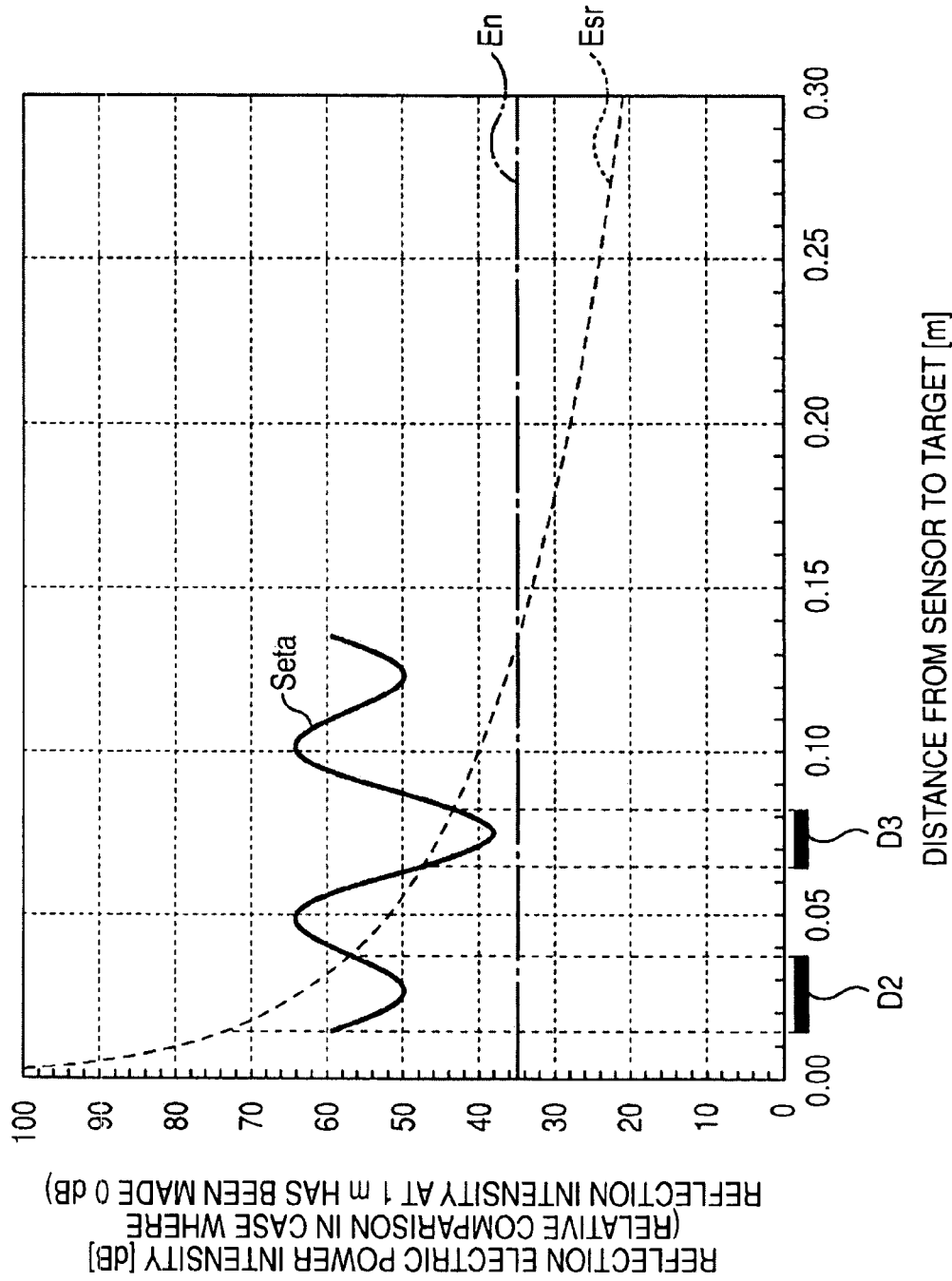
FIG. 7 is a view explaining one example of the detection possible range of the conventional pulse sensor in FIG. 1 in a case where the transmission signal to which the band restriction has been applied is outputted.

About such an issue, there is additionally explained by referring to FIG. 6 and FIG. 7. FIG. 6 is a view explaining one example of a detection possible range (the sensitivity good region) in a case where there is outputted the transmission signal Ss to which the band restriction is not applied, i.e., the transmission signal Ss of the ideal impulse waveform in FIG. 2. In contrast to this, FIG. 7 is a view explaining one example of the detection possible range (the sensitivity good region) in a case where there is outputted the transmission signal Ss to which the band restriction has been applied, i.e., the transmission signal Ss including the waveform of the main frequency f2 in FIG. 4.

In FIG. 6 and FIG. 7, an axis of abscissa shows a distance [m] from a sensor (in the example in FIG. 1, the conventional pulse sensor 1) to a target (in the example in FIG. 1, the approaching body), and an axis of ordinate shows the reflection electric power intensity [dB] (where, a relative comparison in a case where the reflection intensity at 1 m has been made 0 [dB]). Further, a curve Esr shows one example of the reflection electric power intensity from the target. That is, the curve Esr shows the reflection electric power intensity from the target in a case where a reflection sectional area is constant and the reflection electric power intensity at the distance 1 [m] has been made 0 [dB]. Further, a curve En shows one example of the electric power intensity of a disturbance noise. Here, the disturbance noise includes, besides the noise resulting from the disturbance wave source (communication equipment such as amateur radio, and portable telephone) described in FIG. 1, also the noise resulting from a sensor equipment inside. Incidentally, the above assumption is made similar also about FIG. 8 and FIG. 10, which are mentioned later.

A curve Sei in FIG. 6 shows a characteristic of the lowest reception sensitivity about the conventional pulse sensor 1 in a case where the detection distance is set to about 0.075 [m], and the transmission signal Ss of the ideal impulse waveform in FIG. 2 is outputted.

In this case, it follows that the body (target) is detected in the distance range D1 in which the curve Sei becomes below the curve Esr. That is, in the conventional pulse sensor 1 outputting the transmission signal Ss of the ideal impulse waveform in FIG. 2, the distance range D1 becomes the sensitivity good range, and a range other than it becomes the sensitivity bad range.

In contrast to this, a curve Seta in FIG. 7 shows a characteristic of the lowest reception sensitivity about the conventional pulse sensor 1 in a case where the detection distance is set to about 0.075 [m], and the transmission signal Ss including the waveform of the main frequency f2 in FIG. 4 is outputted.

In this case, it follows that the body (target) is detected in distance ranges D2, D3 in which the curve Seta becomes below the curve Esr. That is, in the conventional pulse sensor 1 outputting the transmission signal Ss including the waveform of the main frequency f2 in FIG. 4, the distance ranges D2, D3 become the sensitivity good ranges, and a range other than them becomes the sensitivity bad range.

In comparing FIG. 6 with FIG. 7, it follows that, if the band restriction is applied to the transmission signal Ss, the sensitivity good range widens as a result (although not intended). That is, in a case where the conventional pulse sensor 1 is utilized in a use detecting the body entering into the predetermined range having been mentioned above, if the band restriction is applied to the transmission signal Ss, the distance range capable of detecting increases as a result.

However, the range other than the distance ranges D2, D3 is still the sensitivity bad range, so that there still generates an issue that the body existing in that sensitivity bad range cannot be detected. That is, in a case where the conventional pulse sensor 1 has been utilized in such a use that the body having entered into a range below 0.075 [m] is detected, if the body enters into the sensitivity bad range other than the distance ranges D2, D3, it follows that the above-mentioned problem still generates because the detection leak occurs.

Thereupon, in order to solve such a problem, the present inventors invented a technique like the below on the basis of a thought like the blow.

That is, time-zones (terms) in which the body exists in the sensitivity good ranges (in the example in FIG. 7, the distance ranges D2, D3) correspond to the terms T2, T4, T6 and the like in the example in FIG. 5, and time-zones (terms) in which the body exists in the sensitivity bad ranges correspond to the terms T3, T5 and the like in FIG. 5.

Here, a reason why there occurs a term in which, in the terms T3, T5 in FIG. 5, the level value of the sampling signal Sp becomes below 0 is because the sampling is performed at a time point in which, as apparent from FIG. 4, the level value of the reflection wave, in the body, of the transmission signal Ss including a wave of the main frequency f2, i.e., the reception signal Sr having the wave of the main frequency f2, becomes below 0. That is, because the sampling value Ps becomes below 0.

Thereupon, by deviating the timing of this sampling by a time (hereafter, referred to as a half-period correspondence time) corresponding to a half-period (=L2/2) of the wave having the main frequency f2 within the transmission signal Ss, a term in which a level of the sampling signal Sp becomes 0 in the terms T3, T5 in FIG. 5 changes to a term in which the level becomes conversely above 0. That is, if the timing of the sampling is deviated by the half-period correspondence time, the waveform of the sampling signal Sp, which is obtained as a result, becomes approximately equivalent to an axisymmetrical waveform, of the waveform in FIG. 5, with respect to a time axis although not shown in the drawing. In other words, by deviating the timing of the sampling by the half-period correspondence time, the sensitivity good range and the sensitivity bad range are approximately replaced.

Figure 8:
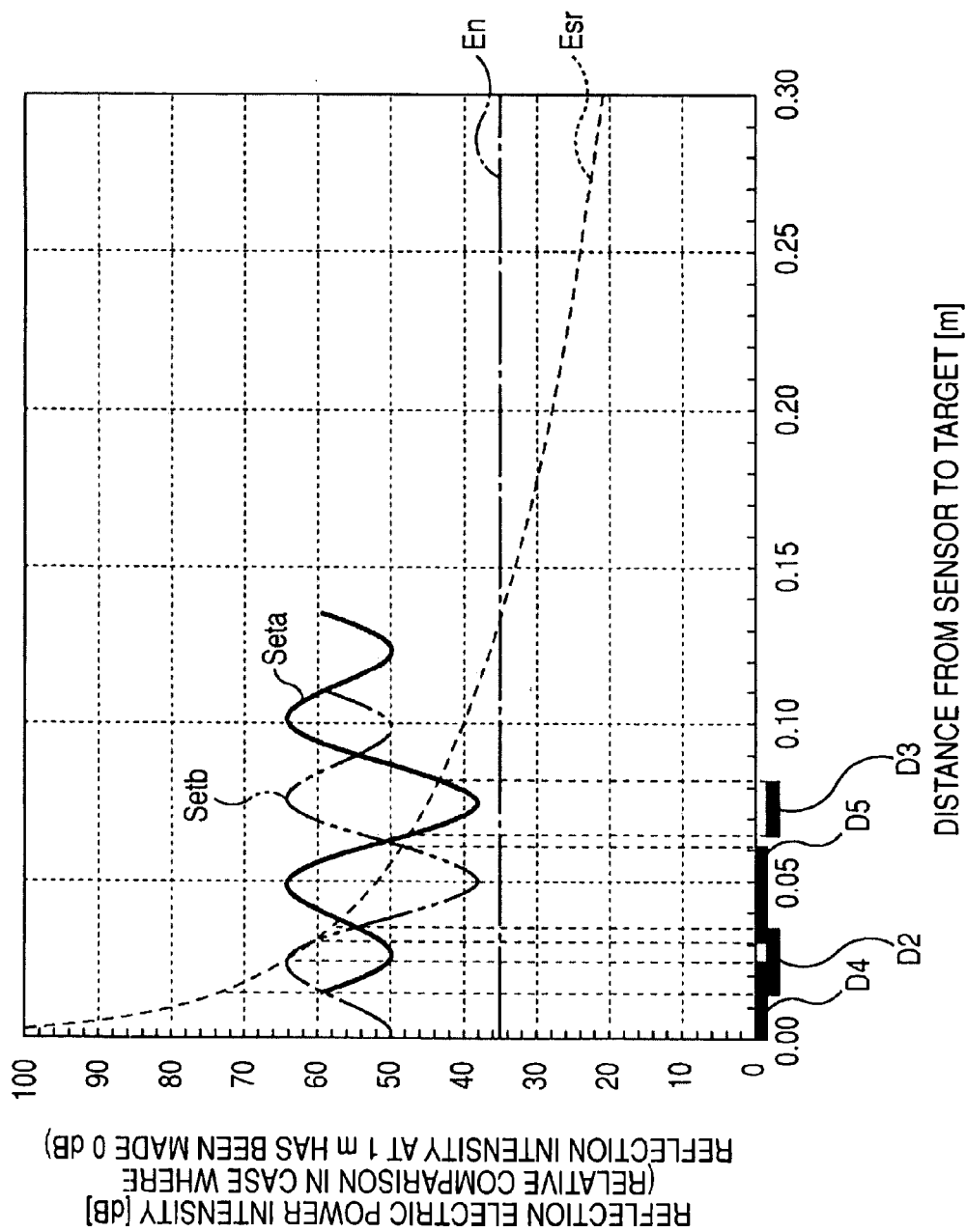
FIG. 8 is a view explaining a technique according to one or more embodiments of the present invention, which explains one example of the detection possible range of a pulse sensor to which one or more embodiments of the present invention has been applied.

Concretely, by deviating the timing of the sampling by the half-period correspondence time, the lowest reception sensitivity about the conventional pulse sensor 1 outputting the transmission signal Ss including the waveform of the main frequency f2 changes from a characteristic shown by the curve Seta in FIG. 7 to a characteristic shown by a curve Setb in FIG. 8. More accurately, the characteristic of the lowest reception sensitivity in a case where the timing of the sampling has been advanced by the half-period correspondence time is shown by the curve Setb in FIG. 8.

In this case, it follows that the body (target) is detected in distance ranges D4, D5 in which the curve Setb in FIG. 8 becomes below the curve Esr. That is, in the conventional pulse sensor 1 outputting the transmission signal Ss including the waveform of the main frequency f2 in FIG. 4, by advancing the timing of the sampling by the half-period correspondence time, the distance ranges D4, D5 can be made the sensitivity good ranges this time.

Accordingly, as shown in FIG. 8, if the characteristic of the lowest reception sensitivity of the pulse sensor can be made a characteristic in which the curves Seta, Setb in FIG. 8 have been combined, it becomes possible to widen the sensitivity good range (detection possible range) till the distance ranges D2 to D5.

The present inventors thought the above content and, on the basis of that thought, invented a technique like the below.

That is, the fact that the timing of the sampling is deviated by the half-period correspondence time is equivalent to the fact that the detection distance is set while being deviated by a distance (hereafter, referred to as a half-wavelength correspondence distance) corresponding to a half-wavelength of the wave of the main frequency f2 within the transmission signal Ss.

Thereupon, the present inventors invented such a technique that a pulse sensor in which two reception systems were mounted had been prepared in regard to one transmission system transmitting the transmission signal to which the band restriction had been applied, the detection distance in each of the reception systems was set while being deviated respectively by the half-wavelength correspondence distance and, in one reception system, the distance range (sensitivity bad range) having no detection sensitivity was detected while being complemented in a separate system. By a realization of this technique, when the approaching body exists in the predetermined range, it becomes possible to detect that body approximately without the leak. That is, it becomes possible to solve the problem having been mentioned above.

Figure 9:
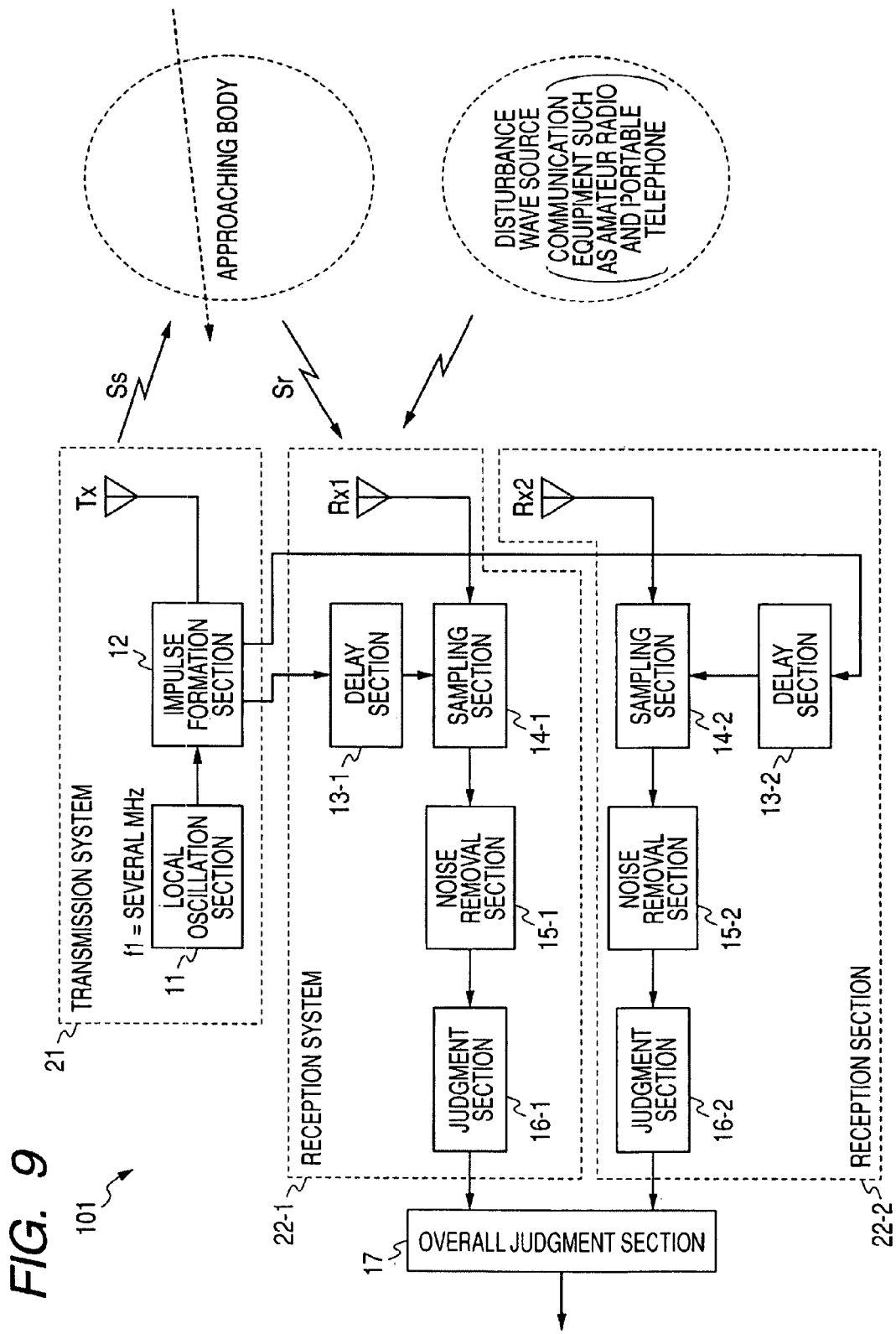
FIG. 9 is a view showing a constitution example of a pulse sensor as one embodiment of a detection device to which one or more embodiments of the present invention has been applied.

Incidentally, although a setting technique of the detection distance is not limited especially, if it is corresponded to the conventional pulse sensor 1 in FIG. 1, a technique setting the delay time of the delay section 13 becomes the setting technique of the detection distance. Accordingly, in a case where the technique of one or more embodiments of the present invention is realized by utilizing such a setting technique of the detection distance, there suffices if it is made as follows for instance. That is, in regard to the transmission system 21 similar to FIG. 1, the pulse sensor is constituted such that the reception system 22 similar to FIG. 1 is mounted by two. Concretely, as shown in FIG. 9 for instance, there is prepared a pulse sensor 101 in which the transmission system 21 and reception systems 22-1 and 22-2 have been mounted. And, each delay time of delay sections 13-1, 13-2 is respectively set while being deviated by the half-period correspondence time. Additionally, an overall judgment section 17 performing a final judgment on the bases of a judgment result each of judgment section 16-1, 16-2 is mounted to the pulse sensor 101. By this, the technique according to one or more embodiments of the present invention can be realized.

Incidentally, about each block constituting the transmission system 21 and reception systems 22-1 and 22-2, since there has been already explained by using FIG. 1, their explanations are omitted here. Thereupon, there are explained about details of setting of the delay times in the delay sections 13-1, 13-2, and the overall judgment section 17.

That is, in the delay section 13-1, there is set a delay time (hereafter, referred to as a reference delay time) corresponding to the detection distance (hereafter, referred to as a reference detection distance, in the example in FIG. 8 for instance, about 0.075 [m] becomes the reference detection distance) which has been set in regard to the reception system 22-1. Further, in the delay section 13-2, a time having been deviated by the half-period correspondence time in regard to the reference delay time is set as the delay time. That is, in regard to the reception system 22-2, a distance (about 0.05 [m] in the example in FIG. 8 for instance) having been deviated by the half-period correspondence distance in regard to the reference detection distance is set as the detection distance.

On the basis of judgment results of the respective judgment sections 16-1, 16-2 in the two reception systems 22-1, 22-2, the overall judgment section 17 performs a final judgment, and outputs a result of that final judgment. For example, in a case where the detection signal has been outputted from at least one between the judgment sections 16-1, 16-2, the overall judgment section 17 outputs a signal (hereafter, referred to as a final detection signal) to the effect that there has been finally detected the fact that the body exists in the predetermined range and, in a case other than that, can prohibit the output of the final detection signal. In this case, if the delay time having been mentioned above about the delay sections 13-1, 13-2 is respectively set, it follows that, when the approaching body exists in the distance ranges D2 to D5 in FIG. 8, the final detection signal is always outputted from the overall judgment section 17.

Incidentally, in the example in FIG. 9, although the judgment sections 16-1, 16-2 are included respectively in the reception systems 22-1, 22-2, there may be made such that they are included in the overall judgment section 17.

By the way, although there becomes a repetition, in the delay section 13-2, the time having been deviated by the half-period correspondence time in regard to the reference delay time of the delay section 13-1 is set as the delay time. However, a direction along which that deviation is performed may be any direction. That is, a time becoming a short time by the half-period correspondence time in regard to the reference delay time may be set as the delay time of the delay section 13-2. Or, conversely to it, i.e., a time becoming a long time by the half-period correspondence time in regard to the reference delay time may be set as the delay time of the delay section 13-2.

In other words, in the reception system 22-2, a distance having been deviated by the half-wavelength correspondence distance in regard to the reference detection distance of the reception system 22-1 is set as the detection distance. However, the direction along which that deviation is performed may be any direction. That is, a distance becoming a short distance by the half-period correspondence distance in regard to the reference detection distance may be set as the detection distance of the reception system 22-2. Or, conversely to it, i.e., a distance becoming a long distance by the half-wavelength correspondence distance in regard to the reference detection distance may be set as the detection distance of the reception system 22-2.

Concretely, for example, the above-mentioned example in FIG. 8 is an example in a case where the reference detection distance of the reception system 22-1 has been set to about 0.075 [m] and the distance becoming the short distance (about 0.05 [m]) by the half-wavelength correspondence distance (about 0.025 [m]) in regard to that reference detection distance has been set as the detection distance of the reception system 22-2.

That is, in the pulse sensor 101 in FIG. 9, the reference delay time of the delay section 13-1 is set such that the reference detection distance becomes about 0.075 [m]. The characteristic of the lowest reception sensitivity about the reception system 22-1 then becomes like the curve Seta in FIG. 8.

Further, the delay time of the delay section 13-2 is set such that the distance becoming the short distance by the half-wavelength correspondence distance in regard to that reference detection distance, i.e., about 0.05 [m], becomes the detection distance. The characteristic of the lowest reception sensitivity about the reception system 22-2 then becomes like the curve Setb in FIG. 8.

By this, as having been mentioned above, it follows that, when the approaching body exists in the distance ranges D2 to D5 in FIG. 8, the final detection signal is always outputted from the overall judgment section 17. That is, it follows such that, in a stage in which the body has approached till about 0.08 [m], an output of the final detection signal of the overall judgment section 17 is commenced.

Figure 10:
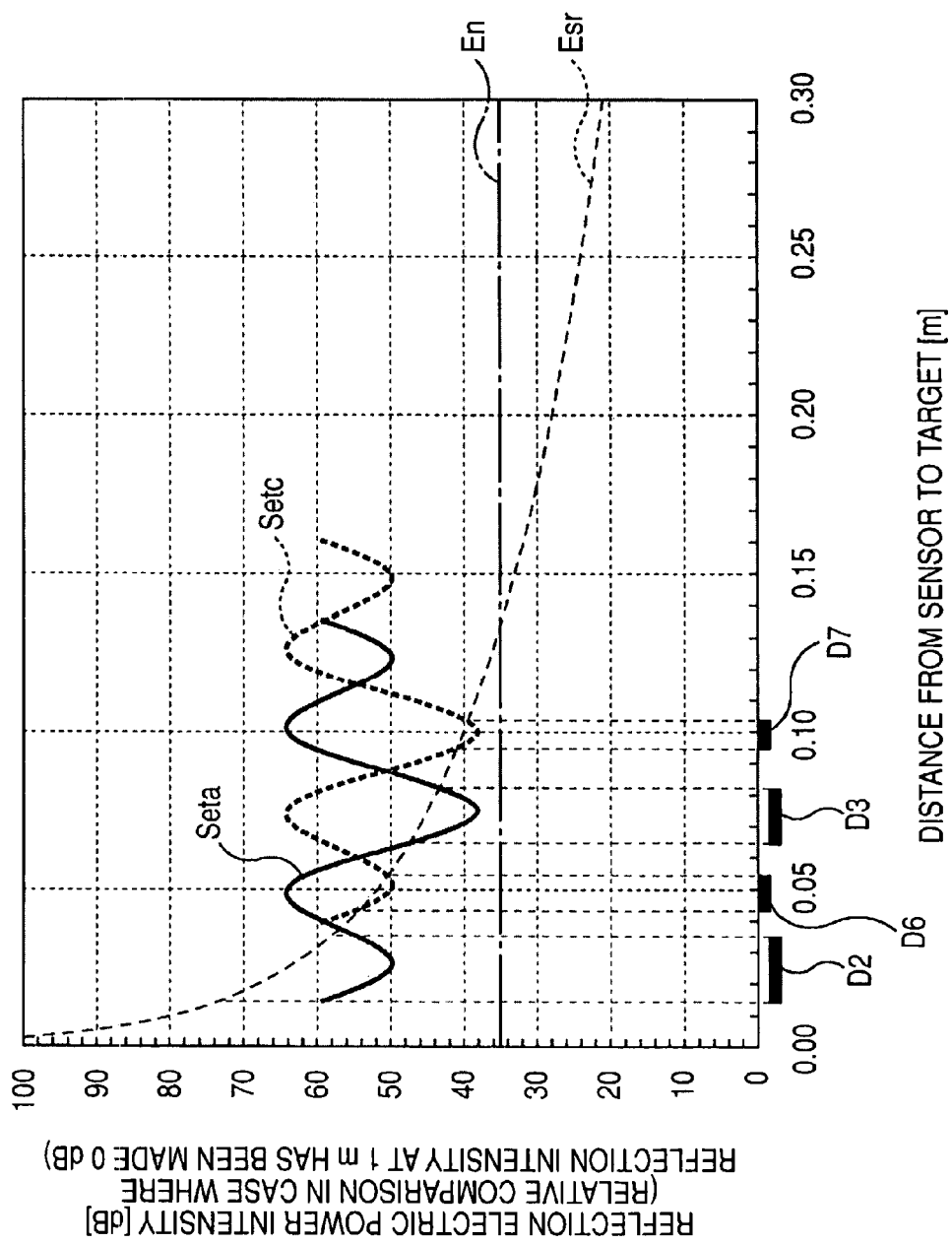
FIG. 10 is a view explaining the technique according to one or more embodiments of the present invention, which explains other example of the detection possible range of the pulse sensor to which one or more embodiments of the present invention has bee applied.

In contrast to the example like this in FIG. 8, in FIG. 10 there is shown an example in a case where the reference detection distance of the reception system 22-1 has been set to about 0.075 [m] and the distance (about 0.10 [m]) becoming the long distance by the half-wavelength correspondence distance (about 0.025 [m]) in regard to that reference detection distance has been set as the detection distance of the reception system 22-2, i.e., a case where the delay times of the delay sections 13-1, 13-2 have been set such that about 0.075 [m], about 0.10 [m] become respectively the detection distances. That is, the characteristic of the lowest reception sensitivity about the reception system 22-1 in this case becomes like the curve Seta in the same drawing, and the characteristic of the lowest reception sensitivity about the reception system 22-2 becomes like a curve Setc in the same drawing.

In this example in FIG. 10, it follows that the body (target) is detected in distance ranges D6, D7 in which the curve Setc becomes below the curve Esr, in addition to the distance ranges D2, D3 similar to the example in FIG. 8. That is, in the example in FIG. 10, in addition to the distance ranges D2, D3, the distance ranges D6, D7 additionally become the sensitivity good ranges, and the range other than them becomes the sensitivity bad range.

Accordingly, in the case where each detection distance has been set like the example in FIG. 10, when the approaching body exists in the distance ranges D2, D3, D6, D7, the final detection signal is always outputted from the overall judgment section 17 in FIG. 9. That is, it follows such that, in a stage in which the body has approached till about 0.105 [m], the output of the final detection signal of the overall judgment section 17 is commenced.

As having been explained above, in comparing FIG. 8 with FIG. 10, it becomes possible that rather the example in FIG. 10 detects the approaching body in the more faraway place, i.e., detects faster. If said more generally, as the detection distances of the two reception systems, the distance becoming the short distance by the half-wavelength correspondence distance in regard to one reference detection distance may be set as the other detection distance, or conversely to it, i.e., the distance becoming the long distance by the half-wavelength correspondence distance in regard to the reference detection distance may be set as the other detection distance. However, if rather the latter setting is performed, it becomes possible to detect the approaching body in the more faraway place, i.e., detect faster.

By the way, although it is also possible to implement a series of processings (or processing of one portion among them) following upon the above-mentioned operation by a hardware, it is also possible to implement them by a software.

Figure 11:
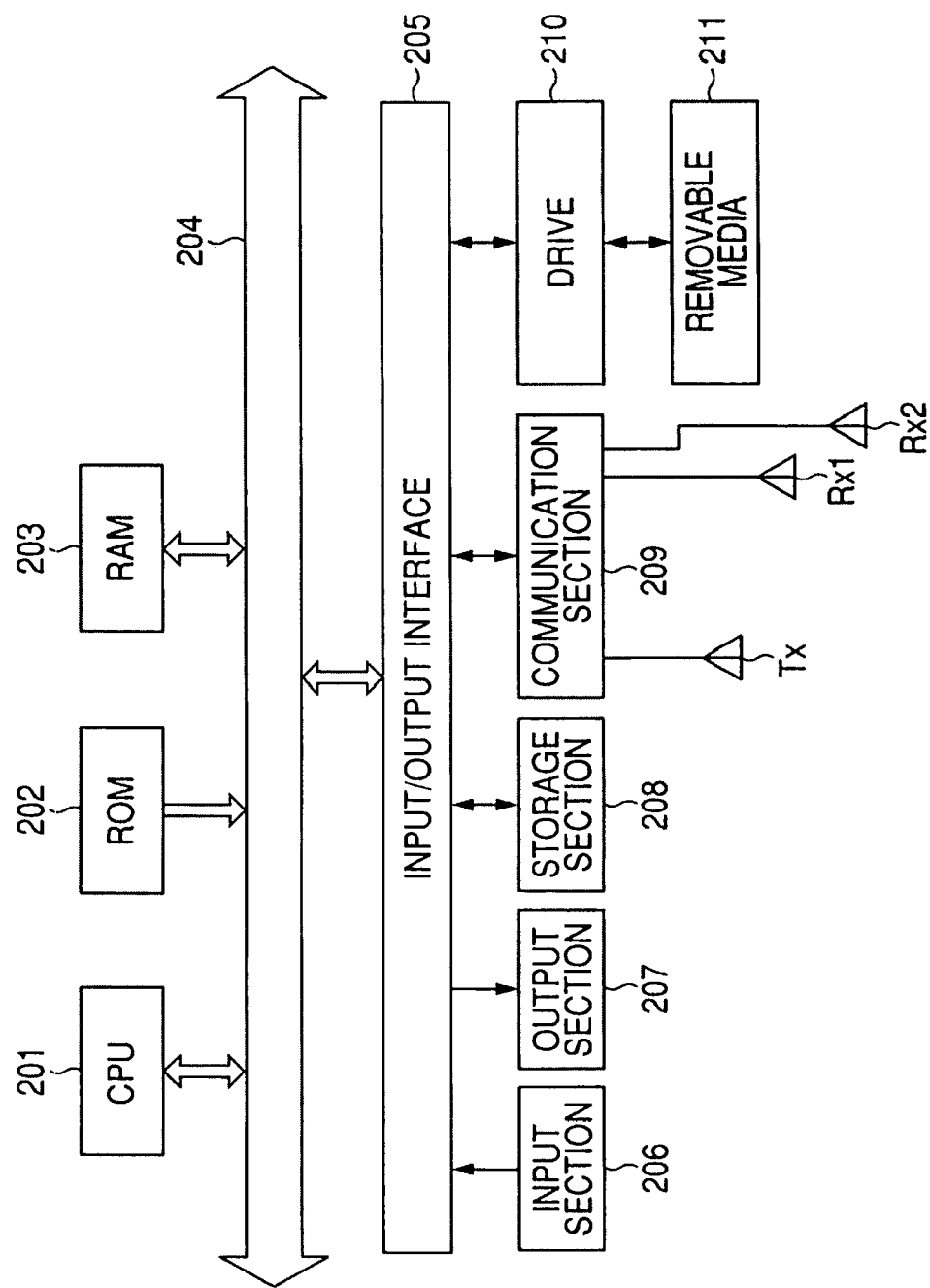
FIG. 11 is a block diagram showing other example of a constitution of all or one portion of the detection device to which one or more embodiments of the present invention is applied.

In this case, the detection device (sensor) implementing that series of processings, or its one portion can be constituted by such a computer as shown in FIG. 11 for instance.

In FIG. 11, a CPU (Central Processing Unit) 201 implements various processings in compliance with a program recorded in a ROM (Read Only Memory) 202, or a program having been loaded to a RAM (Random Access Memory) 203 from a storage section 208 In the RAM 203, there are further stored suitably a data necessary for the CPU 201 to implement the various processings, and the like as well.

The CPU 201, the ROM 202 and the RAM 203 are mutually connected through a bus 204. To this bus 204, further there is connected an input/output interface 205 as well.

To the input/output interface 205, there are connected an input section 206 comprising a keyboard, a mouse and the like, an output section 207 comprising a display and the like, the storage section 208 composed of a hard disk and the like, and a communication section 209 composed of a modem, a terminal adapter and the like. The communication section 209 performs a communication processing with other device through a network including the Internet. Furthermore, the communication section 209 performs also a transmission/reception processing for transmitting the transmission signal Ss from the antenna Tx, and receiving the reception signal Sr to the antennas Rx1, Rx2.

To the input/output interface 205, there is further connected a drive 210 in compliance with a necessity, and there is suitably mounted removable media 211 comprising a magnetic disk, an optical disk, a photomagnetic disk, a semiconductor memory, or the like, and a computer program having been read from them is installed to the storage section 208 in compliance with a necessity.

In the case where the series of processings are implemented by the software, a program constituting that software is installed from the network or a recording medium to a computer in which a program constituting that software is incorporated in an exclusive hardware or, e.g., a general purpose personal computer capable of implementing various functions by installing various programs, and the like.

As shown in FIG. 11, the recording medium including the program like this is constituted not only by the removable media (package media) 211 distributed separately from a device main body in order to provide the program to a user, and comprising the magnetic disk (including a floppy disk), the optical disk (including a CD-ROM (Compact Disk-Read Only Memory), a DVD (Digital Versatile Disk)), the photo-magnetic disk (including an MD (Mini-Disk)), the semiconductor memory, or the like, in which the program has been recorded, and constituted but also by the ROM 202, a hard disk included in the storage section 208, or the like, which is provided to the user under a state being previously incorporated in the device main body, and in which the program is recorded.

Incidentally, in the present specification, a step describing the program recorded in the recording medium is one including of course a processing performed in a time series along its sequence, and also a processing implemented in parallel or individually although not processed necessarily in the time series.

Further, the above-mentioned technique according to one or more embodiments of the present invention can be applied to devices and systems of various constitutions, not only to the pulse sensor 101 of the constitution in FIG. 9. Incidentally, here, the system is one denoting the whole device constituted by plural processing devices or processing sections.

What is claimed is:

1. A detection device for detecting a body entering a predetermined range, comprising:
   a transmission means for periodically radiating a pulse-like transmission signal in a form of an electromagnetic wave to which a band restriction has been applied, the pulse-like transmission signal generated from determining a main frequency wave and creating additional waves of different frequencies based on the main frequency wave and combining the additional waves with the main frequency wave;
   a first reception means and a second reception means, each of which perform:
      receiving, as a reception signal, the electromagnetic wave reflected by the body,
      sampling of the reception signal after a predetermined delay time has elapsed from transmission, the first reception means sampling at the end of a first delay time and the second reception means sampling at the end of a second delay time, and
      judging, based on the sampling, whether the body is present; and
   a judgment means for:
      judging, based on judgment results of each of the first reception means and the second reception means, whether the body has entered into the predetermined range, and
      outputting a judgment result,
   wherein the second delay time is set to be an offset of the first delay time by a length of time equivalent to a half-period of the main frequency wave of the transmission signal.

2. A detection device according to claim 1, wherein the second delay time is set to be the first delay time plus the time equivalent to the half-period of the main frequency wave of the transmission signal.

3. A detection device according to claim 1, wherein:
   the predetermined range is a distance from the detection device of less than one meter, and
   a shape of the body is varied.

4. A detection method in a detection device, wherein the detection device:
   periodically radiating a pulse-like transmission signal in a form of an electromagnetic wave to which a band restriction has been applied, the pulse-like transmission signal generated from determining a main frequency wave and creating additional waves of different frequencies based on the main frequency wave and combining the additional waves with the main frequency wave;
   receiving, as a reception signal, the electromagnetic wave reflected by a body; and
   detecting, based on the reception signal, the body that has entered into a predetermined range, the detection method comprising steps of:
   individually performing, in each of two systems,
      sampling of the reception signal after a predetermined delay time has elapsed from transmission of the transmission signal, a first system sampling at the end of a first delay time and a second system sampling at the end of a second delay time, and
      judging, based on a result of the sampling, whether the body is present, and
   determining, based on judgment results of each of the two systems, whether the body has entered into the predetermined range, and
   outputting a judgment result,
   wherein the second delay time is set to be an offset from the first delay time by a length of time equivalent to a half-period of a main frequency wave of the transmission signal.

* * * * *